(12) United States Patent
Tuzsuzov

(10) Patent No.: US 10,042,197 B2
(45) Date of Patent: Aug. 7, 2018

(54) DISPLAY DEVICE

(71) Applicant: Visteon Global Tchnologies, Inc, Van Buren Township, MI (US)

(72) Inventor: Jordan Tuzsuzov, Watzbachtal (DE)

(73) Assignee: VISTEON GLOBAL TECHNOLOGIES, INC., Van Buren Township, MI (US)

( * ) Notice: Subject to any disclaimer, the term of this patent is extended or adjusted under 35 U.S.C. 154(b) by 0 days.

(21) Appl. No.: 15/100,318

(22) PCT Filed: Nov. 28, 2014

(86) PCT No.: PCT/EP2014/075994
§ 371 (c)(1),
(2) Date: Sep. 5, 2016

(87) PCT Pub. No.: WO2015/079036
PCT Pub. Date: Jun. 4, 2015

(65) Prior Publication Data
US 2016/0370645 A1 Dec. 22, 2016

(30) Foreign Application Priority Data
Nov. 29, 2013 (DE) ........................ 10 2013 017 973

(51) Int. Cl.
*G02F 1/1335* (2006.01)
*B60K 35/00* (2006.01)
*G02F 1/1333* (2006.01)
*G06F 1/16* (2006.01)

(52) U.S. Cl.
CPC ........ *G02F 1/133502* (2013.01); *B60K 35/00* (2013.01); *G02F 1/133308* (2013.01); *G06F 1/1626* (2013.01); *B60K 2350/203* (2013.01); *B60K 2350/2082* (2013.01); *B60K 2350/2091* (2013.01); *G02F 2001/133331* (2013.01)

(58) Field of Classification Search
None
See application file for complete search history.

(56) References Cited

U.S. PATENT DOCUMENTS 8,243,225 B2 * 8/2012 Kai ...................... G06F 3/0414
349/12
2011/0134378 A1 6/2011 Tsuboi et al.

FOREIGN PATENT DOCUMENTS

| DE | 10220335 A1 | 11/2003 |
| JP | 2010271552 A | 12/2010 |
| WO | WO 2010117114 A1 | 10/2010 |

* cited by examiner

Primary Examiner — Ashok Patel
(74) Attorney, Agent, or Firm — Leydig, Voit & Mayer, Ltd.

(57) ABSTRACT

A display device includes a first display segment having an at least partly transparent cover element that has a main plane of extent and a front side and a rear side, and a second display segment having at least one display unit arranged on the rear side of the partly transparent cover element. The partly transparent cover element has a higher transparency in the region of the display unit than in at least one other region. The partly transparent cover element has a transitional region between the region of low transparency and the region of higher transparency. The transitional region has an extent parallel to the main plane of extent of the cover element.

9 Claims, 2 Drawing Sheets

DISPLAY DEVICE

CROSS REFERENCE TO RELATED APPLICATIONS

This application is a U.S. National Stage Application under 35 U.S.C. § 371 of International Application No. PCT/EP2014/075994 filed on Nov. 28, 2014, and claims benefit to German Patent Application No. DE 10 2013 017 973.4 filed on Nov. 29, 2013. The International Application was published in German on Jun. 4, 2015 as WO 2015/079036 A1 under PCT Article 21(2).

FIELD

The present invention relates to a display device having a first display segment and a second display segment, wherein the first display segment comprises an at least partly transparent cover element that has a main plane of extent and a front side and a rear side, and wherein the second display segment comprises at least one display unit, wherein the display unit is arranged on the rear side of the cover element, and wherein the cover element has a higher transparency in the region of the display unit than in at least one other region.

BACKGROUND

Display devices for achieving a "black panel effect" are known from the prior art. In this case, display elements or display units are supposed to be visible only when switched on. By virtue of the fact that the display elements or units are not visible when switched off, the display device appears to be a smooth black surface, thereby enhancing the high quality impression made by the display device. Display devices of this kind often have digital display units, which are already barely visible when switched off.

In order to ensure adequate brightness and hence adequate visibility for a user, the display units must have a high brightness, thereby necessitating more expensive components, which furthermore have a higher energy consumption. In order to lower the costs and energy consumption of a display device of this kind, there is a known practice of providing the cover element with a higher transparency in the region of the display unit, so that, while retaining the same black panel effect, a less bright display unit can be used.

In this case, there is the problem that the transition between high transparency and low transparency gives rise to reflections, for example, thereby making the transitions visible to a user. Moreover, the production of a display device of this kind is complex.

SUMMARY

In an embodiment, the present invention provides a display device including a first display segment having an at least partly transparent cover element that has a main plane of extent and a front side and a rear side, and a second display segment having at least one display unit, the at least one display unit being arranged on the rear side of the cover element. The cover element has a higher transparency in a region of the at least one display unit than in at least one other region. The cover element has a transitional region between the at least one other region of lower transparency and the region of higher transparency. The transitional region has an extent parallel to the main plane of extent of the cover element.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following.

DETAILED DESCRIPTION

Figure 1:
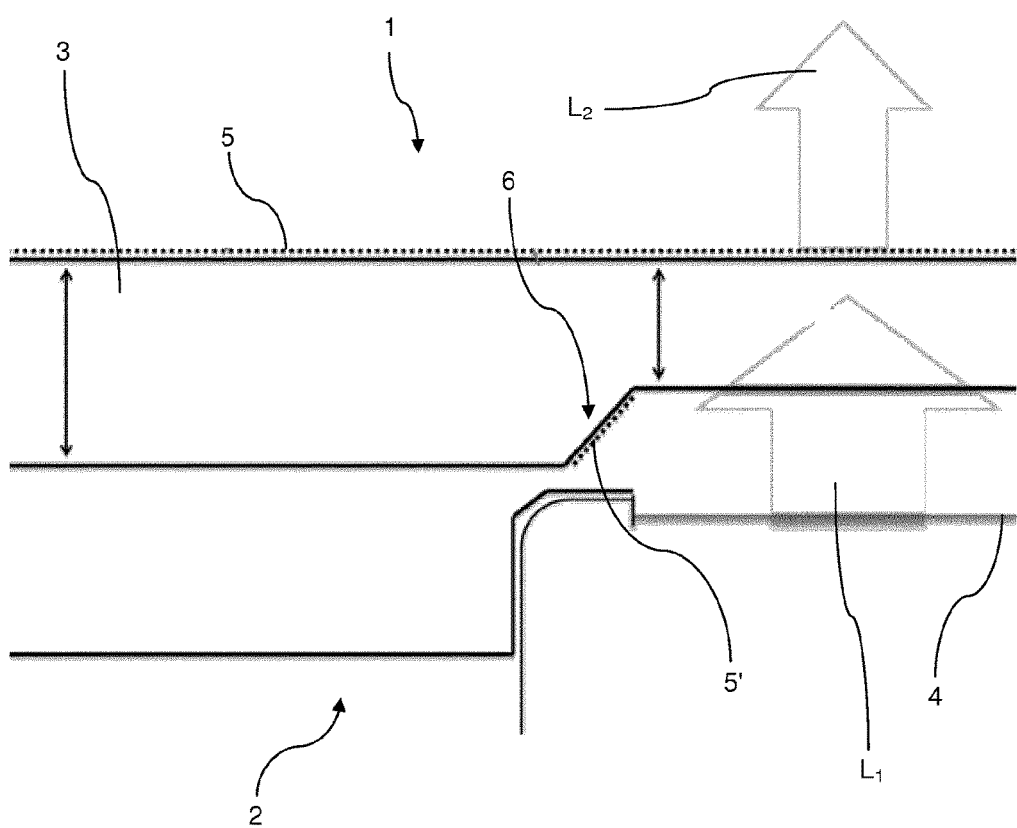
FIG. 1 shows a display device according to an embodiment of the invention.

According to an embodiment, the present invention provides a display device that has a black panel effect but does not have disadvantages of the prior art. An embodiment of the present invention provides a display device having a first display segment and a second display segment, wherein the first display segment comprises an at least partly transparent cover element that has a main plane of extent and a front side and a rear side, and wherein the second display segment comprises at least one display unit, wherein the display unit is arranged on the rear side of the cover element, and wherein the cover element has a higher transparency in the region of the display unit than in at least one other region, wherein the cover element has a transitional region between the region of low transparency and the region of higher transparency, wherein the transitional region has an extent parallel to the main plane of extent of the cover element.

An embodiment of the invention relates to a display device having a first display segment and a second display segment, wherein the first display segment comprises an at least partly transparent cover element that has a main plane of extent and a front side and a rear side, and wherein the second display segment comprises at least one display unit, wherein the display unit is arranged on the rear side of the cover element, and wherein the cover element has a higher transparency in the region of the display unit than in at least one other region. The cover element is preferably manufactured from glass, particularly preferably from polymethylmethacrylate (PMMA), very particularly preferably from polycarbonate (PC). The cover element can preferably be produced by injection molding. The first and second display segments are preferably connected to one another positively, nonpositively and/or materially. The provision of a transitional region advantageously makes it possible to ensure that the transition between the regions of high and low transparency is invisible or barely visible to a user and thus that a uniform black panel effect is achieved.

The cover element preferably has a lower material thickness in the region of high transparency than in the region of low transparency. The transparency is preferably 40% to 60%, in particular 50%, in the region of the display unit. The transparency is preferably 10% to 40%, particularly preferably 20% to 30%, in particular 25%, in the at least one other region. The material thickness is preferably 0.5 mm to 1.0 mm, particularly preferably 0.7 mm to 0.8 mm, in particular 0.75 mm, in the region of low transparency. The material thickness is preferably 1 mm to 2 mm, particularly preferably 1.3 mm to 1.7 mm, in particular 1.5 mm, in the region of low transparency.

The transparency and/or the material thickness in the transitional region vary/varies constantly or nonconstantly. In particular, this should be interpreted to mean that the transition from the transitional region to the region of low transparency and/or to the region of high transparency is of sharp or continuous design, i.e. has edges or is of rounded configuration, for example, giving a continuous transition or a linear transition. A person skilled in the art will understand that it would normally be possible to make the extent of the transitional region parallel to the main plane of extent of the cover element shorter in the case of a linear transition than in the case of a continuous transition.

As a particularly preferred option, the transitional region is provided completely above the display unit in the case of the linear or constantly varying transition. As a very particularly preferred option, the transitional region is provided partly above the display unit in the case of the continuous or continuously varying transition.

The second display segment preferably has at least one display element, in particular symbols and/or pointer-type instruments. As a particularly preferred option, this display element is provided in the region of low transparency. It is thereby advantageously possible for a warning symbol, for example, to be invisible to a user when not illuminated. Very particularly, the second display segment has a multiplicity of different display elements. Even more preferably, the display elements are provided in such a way that they can be illuminated selectively.

The first display segment preferably at least partly has an antireflection coating on the front side of the cover element. As a particularly preferred option, an antireflection film is arranged on the front side of the cover element. It is thereby advantageously possible to increase the legibility of the display unit and/or of the display elements.

The first and/or second display segment preferably has/have an antireflection coating on the rear side of the cover element, at least in the transitional region. As a very particularly preferred option, an antireflection coating, in particular an antireflection film, is provided on the rear side of the cover element in the transitional region.

The display unit is preferably a liquid crystal display. As a particularly preferred option, the display unit has a luminance, when switched on, such that the luminance is at least 400 cd/m$^2$ or at least 450 cd/m$^2$ on the front side of the cover element. As a very particularly preferred option, the display unit has a luminance of at least 700 cd/m$^2$, 800 cd/m$^2$, 900 cd/m$^2$, 1000 cd/m$^2$ or up to 1600 cd/m$^2$.

The present invention furthermore relates to the use of a display device according to the invention in an instrument cluster of a motor vehicle. The disclosures made in respect of this subject matter are also intended to apply to all other subjects according to the invention and vice versa.

An illustrative embodiment of the display device according to the invention is shown in FIG. 1. The display device is arranged in an instrument cluster of a motor vehicle, for example. The display device has a first display segment 1 and a second display segment 2. The first display segment 1 comprises a cover element 3 having a front side and a rear side. Here, the cover element 3 is produced from polymethylmethacrylate (PMMA) in an injection molding process or a compression molding process, for example, or in any other molding production process known to a person skilled in the art. As an alternative or in addition, the cover element 3 is composed of glass and/or polycarbonate (PC).

The second display segment 2 comprises at least one display unit 4, in this case a liquid crystal display 4. The second display segment 2 can furthermore comprise display elements such as pointer-type instruments and/or warning or information symbols.

Here, the cover element 3 has a material thickness of 0.75 mm and a transparency of about 50% in the region of the liquid crystal display 4. In the remaining region of the display device, the cover element 3 here has a material thickness of 1.5 mm and a transparency of about 25%.

Here, the liquid crystal display 4 has a luminance of 900 cd/m$^2$, as a result of which a luminance of 450 cd/m$^2$ is achieved on the front side of the cover element 3, which is sufficient to enable a user to read the liquid crystal display 4.

On its rear side, the cover element 3 has a transitional region 6 between the regions of different material thickness or transparency. This transitional region 6 has a certain extent parallel to the main plane of extent of the cover element 3. In particular, the extent is not equal to zero. Here, the transitional region 6 is provided in a linear form, that is to say the material thickness increases constantly from left to right in the drawing. At the boundary between the transitional region 6 and the region of high or low transparency, there is therefore a sharp transition, e.g. in the form of an edge.

Here, the cover element 3 has an antireflection coating 5, e.g. in the form of an antireflection film, on its front side. As a result, troublesome light reflections are avoided and the user can read the display device according to the invention easily. Here, the cover element 3 furthermore has an antireflection coating 5' in the transitional region 6 on its rear side too. Troublesome light reflections in the transitional region are thereby avoided.

According to the embodiment shown, the liquid crystal display 4 has a frame, and the transitional region 6 is provided above the frame. Here, the transitional region 6 has a relatively steep slope, with the result that the extent of the transitional region 6 is small, and the transitional region 6 is thus provided completely above the liquid crystal display 4.

Figure 2:
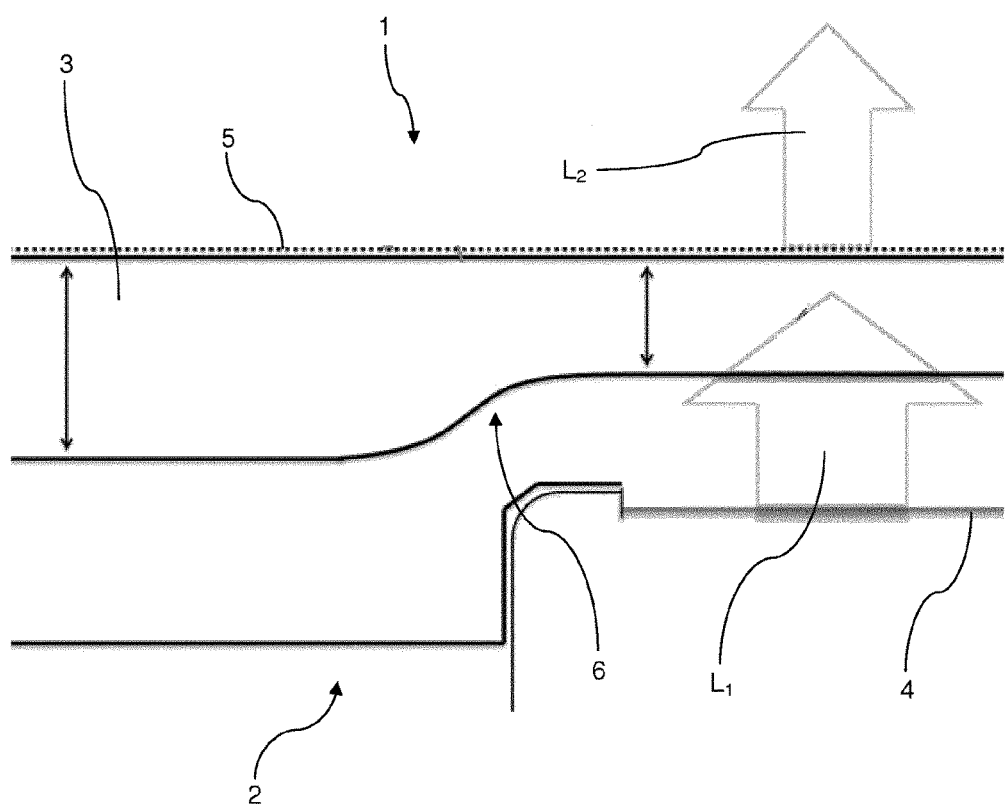
FIG. 2 shows another display device according to an embodiment of the invention.

Another embodiment of the display device according to the invention is shown in FIG. 2. The embodiment shown corresponds essentially to the embodiment described in connection with FIG. 1. Therefore reference may be made to the above statements.

Here, however, the transitional region 6 is of continuous design, i.e. the material thickness increases continuously from left to right in the drawing. By virtue of the continuous transition between the regions, edge reflections are advantageously avoided.

By virtue of the fact that the transitional region 6 is of continuous design, the transitional region 6 according to the embodiment shown has a greater extent parallel to the main direction of extent of the cover element 3 than the embodiment shown in FIG. 1.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE SIGNS 1 first display segment
2 second display segment
3 cover element
4 display device
5, 5' antireflection coating
6 transitional region
$L_1$ brightness of display unit
$L_2$ brightness after cover element

The invention claimed is:

1. A display device, comprising:
   a first display segment having an at least partly transparent cover element that has a main plane of extension and a front side and a rear side; and
   a second display segment having at least one display unit, the at least one display unit being arranged on the rear side of the cover element;
   wherein the cover element has a higher transparency in a first region than in at least one other region, wherein the first region of the cover element corresponds to the display element;
   wherein the cover element has a transitional region between the at least one other region and the first region;
   wherein at least a portion of the transitional region is parallel to the main plane of extension of the cover element;
   wherein material thickness and transparency of the cover element vary in the transitional region of the cover element so as to provide a continuous or linear transition from the transitional region to the first region and/or to the at least one other region.

2. The display device as claimed in claim 1, wherein the cover element has a lower material thickness in the first region than in the at least one other region.

3. The display device as claimed in claim 1, wherein transparency of the cover element in the first region is 40% to 60% and transparency of the cover element in the at least one other 10% to 40% in the at least one other region.

4. The display device as claimed in claim 1, wherein the first region has a material thickness of 0.5 mm to 1.0 mm and the at least one other region has a material thickness of 1 mm to 2 mm.

5. The display device as claimed in claim 1, wherein the first display segment at least partly has an antireflection coating on the front side of the cover element.

6. The display device as claimed in claim 1, further comprising: an antireflection coating disposed on the rear side of the cover element at least in the transitional region.

7. The display device as claimed in claim 1, wherein the at least one display unit comprises a liquid crystal display.

8. The display device as claimed in claim 7, wherein the at least one display unit is configured, when switched on, to provide a luminance of at least 400 cd/m$^2$ on the front side of the cover element.

9. An instrument cluster of a motor vehicle having a display device, wherein the display device comprises:
   a first display segment having an at least partly transparent cover element that has a main plane of extension and a front side and a rear side; and
   a second display segment having at least one display unit, the at least one display unit being arranged on the rear side of the cover element;
   wherein the cover element has a higher transparency in a first region than in at least one other region, wherein the first region of the cover element corresponds to the display element;
   wherein the cover element has a transitional region between the at least one other region and the first region;
   wherein at least a portion of the transitional region is parallel to the main plane of extension of the cover element;
   wherein material thickness and transparency of the cover element vary in the transitional region of the cover element so as to provide a continuous or linear transition from the transitional region to the first region and/or to the at least one other region.

* * * * *